US006966974B1

(12) United States Patent
Ramm-Schmidt et al.

(10) Patent No.: US 6,966,974 B1
(45) Date of Patent: Nov. 22, 2005

(54) PROCESS FOR EVAPORATING A SOLUTION AND AN EVAPORATOR FOR USE IN THE PROCESS

(75) Inventors: Leif Ramm-Schmidt, Kirkkonummi (FI); Kari Myreen, Vantaa (FI); Matti Laajaniemi, Vantaa (FI)

(73) Assignee: Oy Casparado AB, Helsinki (FI)

( * ) Notice: Subject to any disclaimer, the term of this patent is extended or adjusted under 35 U.S.C. 154(b) by 0 days.

(21) Appl. No.: 09/937,904

(22) PCT Filed: Mar. 31, 2000

(86) PCT No.: PCT/FI00/00278

§ 371 (c)(1),
(2), (4) Date: Nov. 9, 2001

(87) PCT Pub. No.: WO00/59598

PCT Pub. Date: Oct. 12, 2000

(30) Foreign Application Priority Data

Apr. 1, 1999 (FI) ...................................... 990735

(51) Int. Cl.⁷ ............................................... B01D 1/22
(52) U.S. Cl. ........................... 203/23; 203/26; 202/172; 202/176; 202/177; 165/110; 165/166; 159/13.3; 159/24.1
(58) Field of Search ................................ 202/172, 176, 202/177; 165/110, 166; 159/13.3, 24.1; 203/23, 203/26

(56) References Cited

U.S. PATENT DOCUMENTS 3,724,522 A * 4/1973 Pogson ...................... 159/13.3
4,341,601 A * 7/1982 Hartig .......................... 203/11

(Continued)

FOREIGN PATENT DOCUMENTS

EP    0 639 096    * 7/1996

(Continued)

Primary Examiner—N. Bhat
(74) Attorney, Agent, or Firm—Birch, Stewart, Kolasch & Birch

(57) ABSTRACT

The invention relates to a method for evaporating a solution and an evaporator applied to it. The evaporator (1) has parallel plate heat exchanger elements (3) fitted inside a jacket (2), consisting of a flexible plastic film, for example, and a liquid distribution space (4) common to the elements, from where the solution to be evaporated can be spread, through supply channels (6), on the heat transmission surfaces (4) of the elements to run from the top downwards. The solution (10) that has not evaporated on the surfaces is recycled from the bottom of the evaporator back to the liquid distribution space, and from there to the heat transmission surfaces (4) of the elements for re-evaporation. In connection with evaporation, precipitate is separated from the solution as a result of over-saturation, ending up in the recirculation flow with the solution and being separated from the solution in the liquid distribution space (14) that works as a separator for the precipitate. The recirculation flow is fed into the space (14) so that the precipitate in it is separated under the effect of its weight and/or kinetic energy, while the flow of the solution is directed upwards, ending up in the supply channels (6) leading to the heat transmission surfaces (4) of the elements. The space (14) can consist of an elongated duct, the flow being fed to its end from a downward curving recirculation line, or the space can consist of a trough, which is provided with lamellas (16) or a perforated intermediate bottom, which separate the precipitate.

17 Claims, 4 Drawing Sheets

U.S. PATENT DOCUMENTS

| | | | | |
|---|---|---|---|---|
| 4,424,098 A | * | 1/1984 | Hartig | 159/13.1 |
| 4,758,385 A | * | 7/1988 | Acker et al. | 261/153 |
| 5,512,141 A | * | 4/1996 | Koistinen et al. | 202/182 |
| 5,770,020 A | * | 6/1998 | Koistinen et al. | 202/172 |
| 5,775,410 A | * | 7/1998 | Ramm-Schmidt et al. | 165/110 |
| 5,931,224 A | * | 8/1999 | Chevallier | 165/153 |
| 6,638,398 B1 | * | 10/2003 | Ramm-Schmidt et al. | 203/34 |

FOREIGN PATENT DOCUMENTS

| | | | |
|---|---|---|---|
| EP | 0 639 097 | * | 12/1997 |
| FI | 79948 B | | 12/1989 |
| FI | 86961 C | | 8/1994 |
| FI | 104518 B | | 2/2000 |
| WO | WO 92/10264 | * | 6/1992 |
| WO | WO 95/08381 | * | 3/1995 |

\* cited by examiner

PROCESS FOR EVAPORATING A SOLUTION AND AN EVAPORATOR FOR USE IN THE PROCESS

This application is the national phase under 35 U.S.C. § 371 of PCT International Application No. PCT/FI00/00278 which has an International filing date of Mar. 31, 2000, which designated the United States of America.

The object of the invention is a method for evaporating a solution, comprising the spreading of the solution on the heat transmission surfaces of the parallel, plate heat exchanger elements of an evaporator to run from the top downwards, the solution being fed from a liquid distribution space common to both elements; the solution that remains on the heat transmission surfaces without evaporating and the precipitate that is formed in connection with evaporation are removed from the lower end of the evaporator, and the solution that has not evaporated is recycled back to the heat transmission surfaces for re-evaporation. Furthermore, the invention is directed at the evaporator used in the said method.

The publications FI 79,948 and 86,961 describe heat exchangers made of bag-like heat transmission elements consisting of film material, such as plastic, which are suitable, among others, for distillation and for concentrating various suspensions. In the heat exchanger, the elements are tied against one another to form a pack, in which water is lead to the outer surfaces of the elements to be evaporated, and then the evaporated steam is compressed to a higher pressure and temperature by a compressor and conducted inside the elements to constitute heating steam, which in the heat transmission is condensed back into water.

The degree of saturation of the components dissolved in the concentration of solutions by evaporation grows, and when the saturation point is exceeded, precipitation results. As examples, we could mention the calcium oxalate precipitated from the bleaching effluents of chemical pulp, the calcium carbonate, calcium sulphate, and calcium silicate, as well as possible iron compounds precipitated from subsoil waters, the denaturised proteins precipitated from the waster water of the food industry, and salts such as gypsum and iron salts or hydroxides precipitated from mineral-bearing waste water. In the heat exchangers according to the publications mentioned above, the precipitate formed on the film surfaces, as well as the solid matter contained by the suspensions that are treated, are easily accumulated into the form of a cake between the bag-like elements, impeding heat transmission and the flow of liquid and steam, which is why the gaps between the elements must perhaps be cleaned from time to time. However, the FI application No. 970,273 discloses an evaporator with improved shapes of elements, so that, during evaporation, the precipitate or other solid matter fall from between the elements onto the bottom of the evaporator; in other words, regarding the elements, the evaporator is self-cleaning.

In evaporators, where the portion of the treated solution or suspension that has not evaporated is recycled back onto the heat transmission surfaces to achieve a sufficient degree of evaporation, one problem remains: the solid matter falling from between the elements onto the bottom of the evaporator gets into the liquid circulation flow, possibly blocking the narrow liquid distribution channels at the upper ends of the elements, from where liquid is fed onto the surfaces of the elements. As the efficiency of evaporation is crucially dependent on an even spreading of liquid onto the heat transmission surfaces of the elements, the precipitate and other solid matter must be removed from the circulation flow in order to prevent blockages in the feeding channels.

The problem with blocking could be alleviated by simply providing the circulation line with a separation device, such as a filter, a cyclone, or a sedimentator, which would separate the precipitate from the liquid before it is recycled back to the evaporation phase, as mentioned above. However, from the point of view of space utilization and costs, this solution would be disadvantageous; in addition, the pressure loss caused by the separator increases the use of energy needed for pumping. If the separator is located at the suction face of the circulation pump, the pressure loss can cause cavitation of the pump. Furthermore, the solid matter coming off from the walls of the recycling tube system subsequent to the separator, which would end up in the liquid distribution channels of the elements, remains a problem.

To avoid the disadvantages mentioned above, according to the invention, the separation of the precipitate or other solid matter from the solution recycled to re-evaporation is arranged so as to take place in connection with the distribution of the liquid to the feeding flow leading to the heat transmission surfaces of the various elements of the evaporator. The method according to the invention is characterized in that the recycled solution is fed to the liquid distribution space so that the precipitate in the solution is separated in the space under the effect of its weight and/or kinetic energy at the same time as the flow of the solution is directed upwards, that the precipitate is removed to the exhaust pipe that starts from the bottom of the space, and that the solution is conducted from the space to the feeding units leading to the heat transmission surfaces of the elements.

The invention is suitable for film evaporators in particular, in which bag-like heat exchanger elements consist of flexible film material, such as plastic film. In these, the precipitate can come off from the heat transmission surfaces not only in connection with washing, but also during a run; in other words, they can be self-cleaning, so that it is essential to remove the loosened precipitate from the solution circulation flow.

According to the invention, by connecting the separation of precipitate to the solution feeding that goes to the heat transmission surfaces it is possible to remove, from the solution, the solid matter originating in not only the heat transmission surfaces but also the recycling tube systems, just before the feeding phase, which is the most crucial phase with regard to blocking. The separation of the precipitate thus arranged does not impede the washing of the evaporator, where large amounts of loosening precipitate go to the wash water, which is removed from the bottom of the evaporator. With respect to the utilization of space and the functionality, it is preferable to locate the liquid distribution space inside the evaporator jacket.

The liquid distribution space can preferably be designed as an elongated duct, one end of which is connected to the recirculation line of the solution, and the opposite end is provided with an exhaust pipe for the precipitate. In this solution, the feeding units leading to the heat transmission surfaces are preferably distributive nozzles that begin from the liquid distribution space and spread out like fans, and each one of them feeds solution to several parallel gaps between the heat transmission surfaces of the heat exchanger elements, where evaporation takes place. Before joining the liquid distribution space, the recirculation line preferably forms a curve directed towards the space downwards from above, which causes the centrifugal force to press the precipitate to the circumference of the line and to the bottom of the liquid distribution space, which is its extension, already at the stage when the solution is coming. The precipitate then drifts, in the form of a bottom flow, along the shortest route from the space to the exhaust pipe.

Alternatively, the liquid distribution space can consist of an elongated trough, which can be provided with parallel, slanting lamellas, under which the recycled solution is fed and between which the solution can flow upwards. In that case, the flow of the solution winds into the flow channels between the lamellas, which are directed upwards, while the precipitate at the same time is separated from the flow under the effect of centrifugal force. This separation based on the kinetic energy of the precipitate is effective especially, when the lamellas are sloped upstream with respect to the incoming direction of the circulated flow. The said curvature of the recirculation line of the solution is advantageous also in this application.

In addition to or instead of the kinetic energy of the precipitate particles, gravitational force can be utilized in the separation of the precipitate by arranging laminar flowing conditions in the liquid distribution space so that the space with its slanting lamellas works as a lamellate settling apparatus. The sedimentation of the particles is advanced, if the bottom of the liquid distribution space is downwards slanting in the incoming direction of the circulated flow.

Furthermore, it is preferable to design the liquid distribution space or its lower part so that it converges, in the incoming direction of the circulated flow, in a sphenoid or conic form towards the exhaust pipe that starts from the opposite side of the space to the recirculation line. In that case, the speed of the stream flow can be kept essentially stable so that, in the space, an even upward flow and an even distribution of liquid to the feeding units of the various heat transmission elements is provided.

Instead of the said slanting lamellas, the trough-like liquid distribution space can be provided with an intermediate bottom that divides it into a lower and upper part, comprising the necessary ports for up flow. The ports can be slanting and the walls defining them can have a more or less lamella-type shape to enhance the separation of the precipitate, or the intermediate bottom can have separating members that permeate the flow, such as cyclones or slanting or curved pipes that serve as flow channels.

The precipitate, which is separated from the liquid distribution space to the exhaust pipe, can be lead to a clarifier, where the precipitate is separated from the liquid that comes with it, the amount of the liquid generally being about 3–50%, preferably 3–25%, of the total amount of the flow circulated in the evaporator, whereupon the liquid can be returned to the recycled flow.

BRIEF DESCRIPTION OF THE DRAWINGS

In the following, the invention is described in detail with the aid of examples and with reference to the appended drawings, in which.

Figure 1:
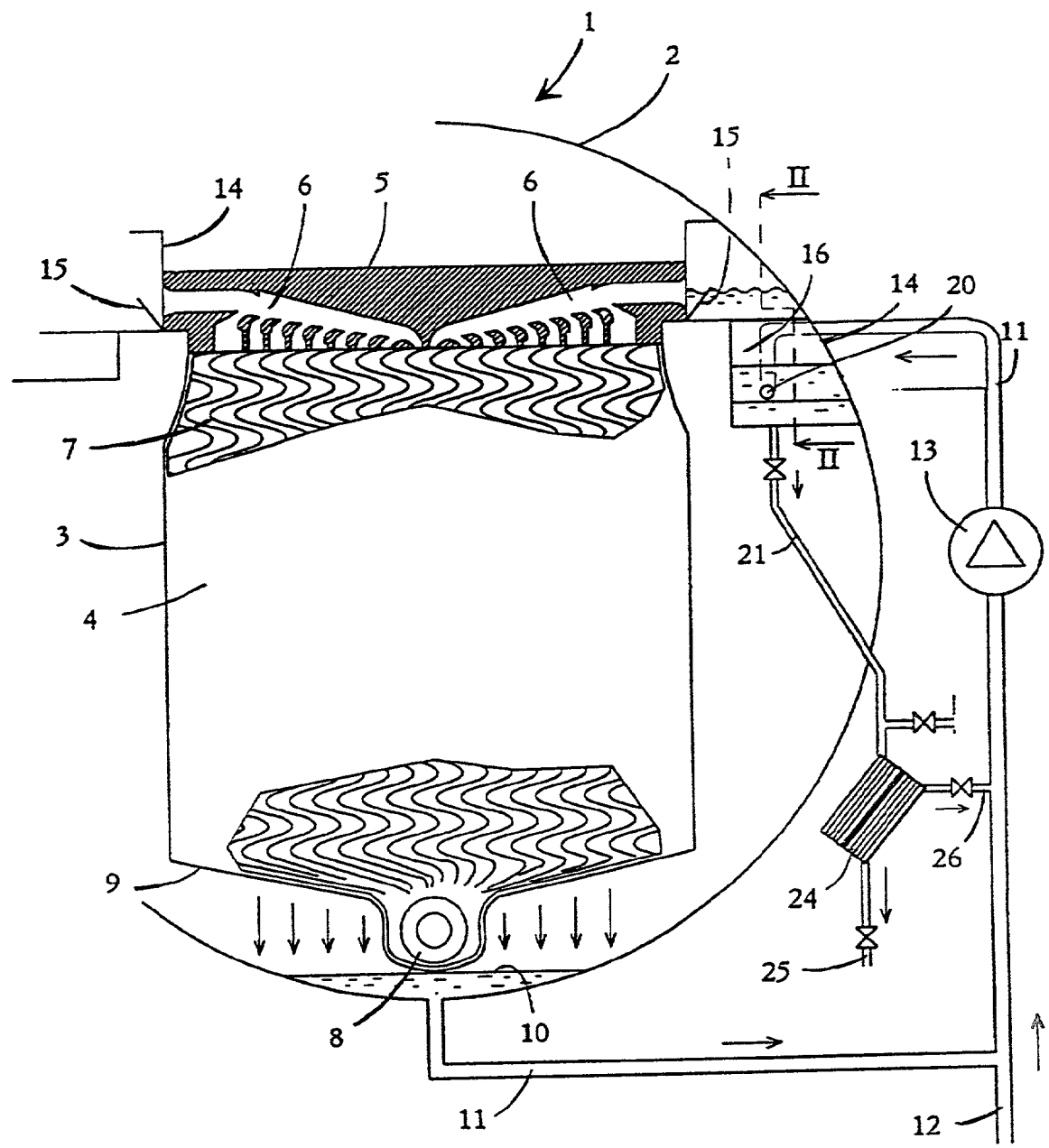
FIG. 1 shows a cross section of an evaporator according to the invention, comprising heat transmission elements made of film material, and liquid circulation channels that have the separation of solid matter arranged in them.

Evaporator 1 according to FIG. 1 comprises a cylindrical jacket 2 and parallel, bag-like heat transmission elements 3 made of plastic film and located inside the jacket. In the evaporator, elements 3 are tied into a pack that can consist of several dozens of elements. The evaporation by heat of the solution that is treated takes places on the outer surfaces 4 of the elements; in other words, in the gaps between the elements located against one another. Heat is obtained from the steam that is simultaneously condensed inside the elements. The steam generated by the evaporation can be used as heating steam and it is circulated through a compressor to the supply channels of steam (not shown) leading inside the elements.

The upper end of each bag-like heat transmission element 3 comprises a lath 5 that is suitably cast from plastic, containing channels 6 for feeding the liquid to be evaporated to the film surfaces between the elements to run downwards from above. By using vertical, winding joints 7, the interior of element 3 is divided into channels that direct the flow of the heating steam and the condensate generated by it towards a discoidal condensate eliminator 8 located at the lower end of the element and jointed inside the element. Bottoms 9 of adjacent elements 3 on both sides of condensate eliminator 8 remain sufficiently apart from one another, so that they allow the precipitate, which was formed in the gaps between the elements in connection with the evaporation or other solid matter that came along with the solution that was evaporated, to fall onto the bottom of the evaporator, where also solution 10 that did not evaporate accumulates.

As at each time of evaporation only a small portion of the solution to be evaporated is converted into steam, evaporator 1 comprises equipment that can be used to repeatedly recycle the solution that has not evaporated back to film surfaces 4 of the elements for re-evaporation. The equipment in question consists of recirculation line 11 that starts from the bottom of the evaporator, combined with line 12, which brings new solution to be evaporated in the evaporation process, pump 13, interior liquid distribution trough 14 of evaporator jacket 2, dam plate 15 that is located in the trough and works as an overflow threshold, and the supply channels 6 of liquid at the upper ends of the elements that we already mentioned. The purpose of the liquid distribution trough 14 is to provide as even a distribution of the solution fed to the evaporation as possible between channels 6 belonging to various elements 3. The solution is supplied onto the film surfaces 4 of the elements symmetrically from the liquid distribution troughs 14 on both sides of the elements, of which, however, only one is shown in detail in FIG. 1.

Figure 2:
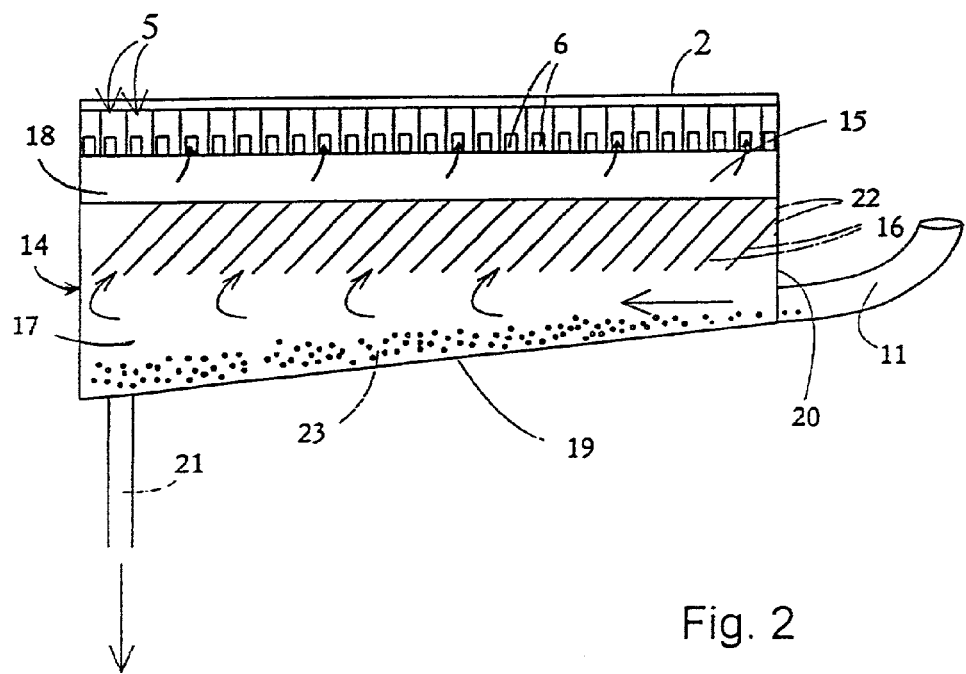
FIG. 2 shows the liquid distribution trough of the evaporator in section II—II of FIG. 1.

FIG. 2 illustrates best the structure of liquid distribution trough 14, which, according to the invention, also works as the separator of the precipitate or other solid matter that comes with the recycled solution. Trough 14 is provided with a number of parallel, slanting lamellas 16, which divide the trough into a lower and upper part 17, 18. According to the figure, inlet conduit 11 for the solution, which is downwards curved, joins with the lower part 17 of the trough, the bottom 19 of which slants towards exhaust piping 21 for the precipitate that starts from the opposite side to the mouth 20 of the circulation line of the trough. Parallel lamellas 16 are slanted towards the incoming direction of the solution so that, in accordance with the arrows in FIG. 2, the flow must wind more than 90° in order to get to flow channels 22 between the lamellas, which are directed obliquely upwards. In this condition, solid matter 23, which comes with the solution, can be separated from the stream flow partly under the effect of its own kinetic energy, i.e., centrifugal force, and partly under the effect of gravitational force, and allowed to sediment towards exhaust piping 21 that starts from the bottom of the trough. By adjusting the rate of flow, the process of flow can be kept, in a laminar and sufficiently slow state, in the lower part 17 of the trough, in the gaps between lamellas 16, so that lamellas 16, which work like clarifiers, ultimately prevent the solid matter from getting to the upper part 18 of the trough, at least not to an adverse extent. In the upper part of the trough, dam plate 15 converts the stream flow, which goes into supply channels 6, into a turbulent form, further decreasing the risk of blocking in the narrow supply channels 6 that are divided into numerous branches (cf. FIG. 1).

In addition to the precipitate, liquid is removed from liquid distribution trough 14 into pipe 21; the amount of the liquid can vary within 3–50% of the flow coming to the trough through recirculation line 11. According to FIG. 1, the final separation of the precipitate from solid matter takes place in lamellate settling apparatus 24, from where the precipitate is removed into line 25 and the liquid is returned through line 26 to the suction face of circulation pump 13. From time to time, precipitate can be removed by rinsing with the valves of lines 21 and 26 being closed.

Figure 3:
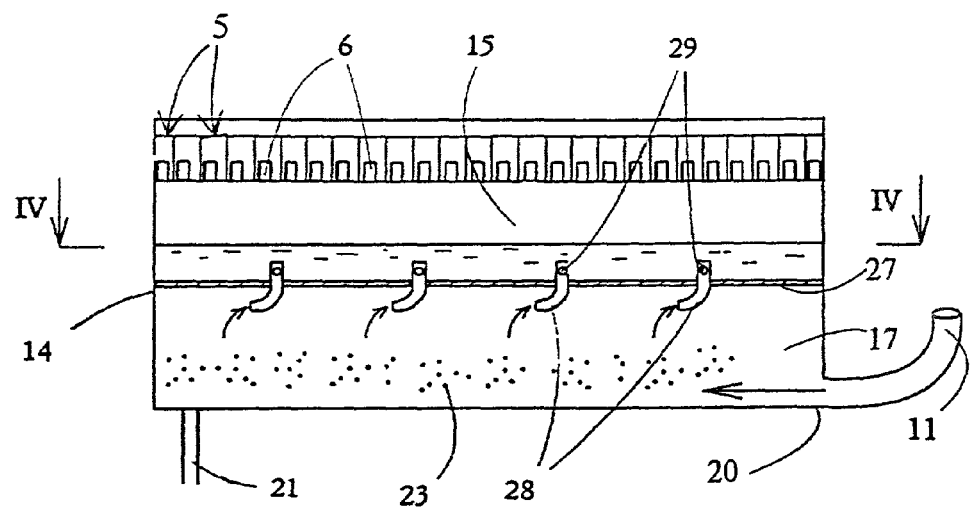
FIG. 3 shows, like FIG. 2, the liquid distribution trough according to another embodiment of the invention.
Figure 4:
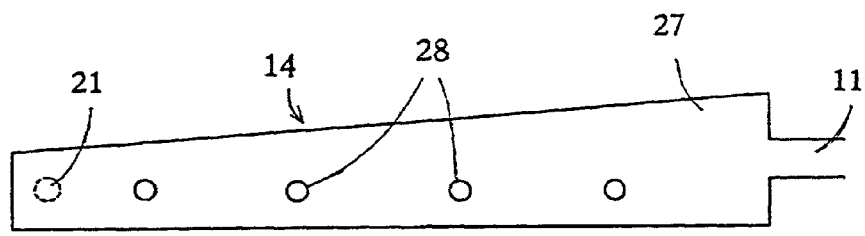
FIG. 4 is the horizontal section IV—IV of FIG. 3.

FIGS. 3 and 4 show liquid distribution trough 14 of the evaporator, which differs from the one in FIG. 2 in that the trough has a flat bottom but it narrows in a V shape from mouth 20 of the recirculation line towards the opposite side of the trough, and that instead of slanting lamellas, the trough comprises intermediate bottom 27 comprising crooked pieces of pipe 28 that work as precipitate separators, allowing liquid to flow through. Gravitational force and the centrifugal force acting in the curved inlet conduit 11 press the precipitate towards the outer circumference of the curve and the bottom of trough 14, so that the majority of the precipitate drift directly to exhaust pipe 21 under the effect of its kinetic energy. The stream flow is directed to the said precipitate separators, where gravitational force separates the precipitate remaining in the flow, while the stream flow continues, through the lateral openings 29 at the upper ends of the separators, to the upper part 18 of liquid distribution trough 14. The flow rate in all pieces of pipe 28 is essentially the same because of the narrowing shape of trough 14.

Figure 5:
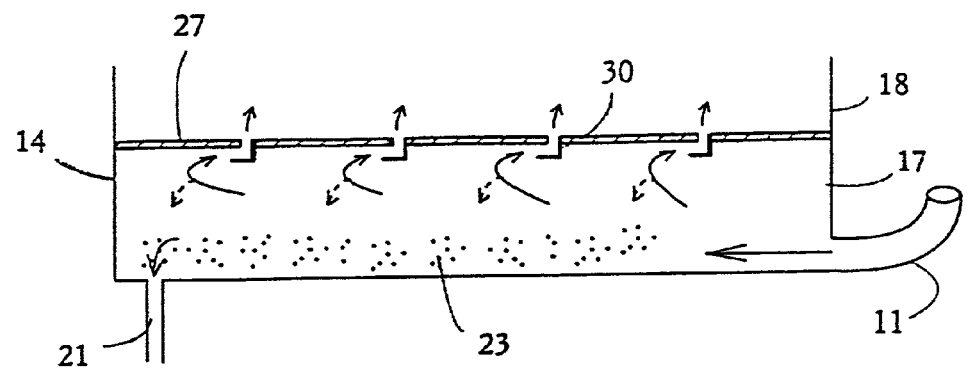
FIG. 5 shows the lower part and the intermediate bottom, provided with precipitate separation members, of the liquid distribution trough in accordance with a third embodiment of the invention.

In the application of liquid distribution trough 14 shown in FIG. 5, the crooked pieces of pipe 28 according to FIG. 3 are replaced with L-shaped projections 30 bordering the flow-through openings in intermediate bottom 27. Otherwise, the application in FIG. 5 corresponds to what is described above.

Figure 6:
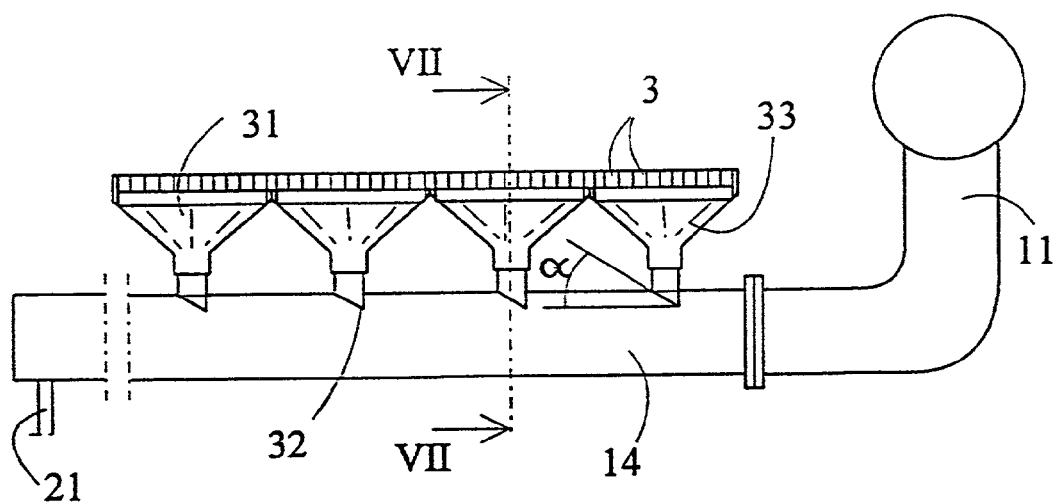
FIG. 6 shows a fifth embodiment of the invention, where parallel distributive nozzles are connected to a tubular liquid distribution space to feed liquid to the heat transmission surfaces of the elements.
Figure 7:
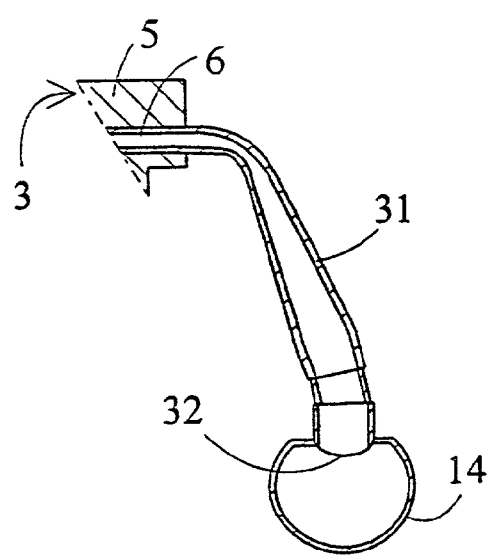
FIG. 7 is the section VII—VII of the pipe and the distributive nozzle according to FIG. 6.

FIGS. 6 and 7 show an application of the invention, where liquid distribution space 14 consists of a pipe with an essentially round cross-section, which is an extension of inlet conduit 11. According to FIG. 7, pipe 11 forms a curve, where centrifugal force presses the solid matter contained by the liquid to the outer circumference of the curve, and further to the bottom of liquid distribution space 14, from where the solid matter ends up in exhaust pipe 21. Parallel distributive nozzles 31 are attached to liquid distribution space 14, distributing the liquid, which is mainly purified of solid matter, to liquid channels 6 contained by end laths 5 of the parallel heat transmission elements 3. Tips 32 of distributive nozzles 31 extending inside liquid distribution space 14 are bevelled to form an angle α, which is suitably about 10–35°, and the nozzles expand in a fan-like shape, so that each one of them feeds liquid to several adjacent elements 3. Furthermore, distributive nozzles 31 are provided with inner baffle plates 33 to ensure an even distribution of liquid.

It is obvious to those skilled in the art that the various embodiments of the invention are not limited to the examples described above, but can vary within the following claims. Thus, the separation of precipitate according to the invention can be applied not only in the film evaporators described above but also in traditional evaporators comprising metal heat transmission elements.

What is claimed is:

1. A method of evaporating a solution, comprising feeding the solution to heat transmission surfaces (4) of parallel plate-formed heat exchanger elements (3) of an evaporator (1), from supply units (6, 31) spreading the solution to the top of said surfaces to flow downwards, removing the part of the solution (10) remaining from the evaporation and precipitate formed in connection with the evaporation from the lower end of the evaporator, and recycling said remaining part of the solution (10) back to the heat transmission surfaces (4) for re-evaporation, said recycling comprising conducting the solution to a liquid distribution space (14) common to said heat exchanger elements (3), separating the precipitate (23) from the solution in said distribution space, the solution forming an upward flow in the distribution space, and passing the solution to said supply units (6, 31) for being spread onto the heat transmission surfaces (4), wherein the recycled solution is fed to the liquid distribution space (14) from a downwardly curved conduit (11) as a curved flow, to separate the precipitate (23) under the combined effect of gravity and centrifugal force, and the precipitate as separated is discharged to an exhaust pipe (21) from the bottom of the liquid distribution space.

2. The method according to claim 1, wherein the solution to be recycled is fed into a narrow, elongated liquid distribution space (14) from its one end, and that the precipitate is removed into an exhaust pipe from the opposite end of the space.

3. The method according to claim 1 or 2, wherein the solution to be recycled is fed underneath parallel lamellas (16) or an intermediate bottom (27) provided with ports (28–30), which are located in the liquid distribution space (14), so that the flow channels (22) between the lamellas, and the precipitate (23) is separated from the flow under the effect of centrifugal force.

4. The method according to claim 1 or 2, wherein the precipitate is lead through an exhaust pipe (21) to a settling apparatus (25), where the precipitate is separated from the liquid phase the comes with it, after which the liquid phase is connected to the recirculation flow of the solution that takes place in the evaporator.

5. The method according to claim 1 or 2, wherein the evaporator is a film evaporator consisting of heat exchanger elements (3) made of flexible film material.

6. An evaporator (1) comprising a jacket (2), parallel upright plate heat exchanger elements (3) fitted inside the jacket, said elements having upright heat transmission surfaces (4), supply units (6, 31) for spreading a solution to be evaporated to the top of said heat transmission surfaces to flow downwards on said surfaces, a liquid distribution space

(14) common to said heat exchanger elements for feeding the solution to said supply units, means for removing the part of the solution (10) remaining from the evaporation and precipitate formed in connection with the evaporation from the lower end of the evaporator and for recycling said remaining part of the solution (10) back to the heat transmission surfaces (4) for re-evaporation, said recycling means comprising a conduit (11) connecting said lower end of the evaporator with said liquid distribution space (14), said space having means for separating the precipitate (23) from the solution being recycled, wherein said conduit (11) for recycling the solution forms a downward curve connected to the liquid distribution space (14), to feed the solution to said space as a curved flow and to separate the precipitate (23) under the combined effect of gravity and centrifugal force, and that an exhaust pipe (21) for discharging the precipitate as separated starts from the bottom of the liquid distribution space.

7. The evaporator according to claim 6, said evaporator being a film evaporator consisting of heat exchanger elements (3) made of flexible film material.

8. The evaporator according to claim 6 or 7, wherein the liquid distribution space (14) is located inside the evaporator jacket (2).

9. The evaporator according to claim 6 or 7, wherein the recirculation line (11) is attached to one end of the elongated liquid distribution space (14), and that the exhaust pipe (21) for the precipitate starts from the opposite end of the liquid distribution space.

10. The evaporator according to claim 6 or 7, wherein the bottom of the liquid distribution space (14) is slanted downwards towards the exhaust pipe (21).

11. The evaporator according to claim 6 or 7, wherein the liquid distribution space (14) converges in a sphenoid or conic form towards the exhaust pipe (21).

12. The evaporator according to claim 6 or 7, wherein the supply units comprise distributive nozzles (31) that start from the liquid distribution space (14) and spread out like fans, each one of them feeding solution to several parallel gaps between the heat transmission surfaces (4) of the heat exchanger elements (3), evaporation taking place in the gaps.

13. The evaporator according to claim 6 or 7, wherein the trough-like liquid distribution space (14) is provided with parallel, slanting lamellas (16) between which the solution is allowed to flow upwards.

14. The evaporator according to claim 6 or 7, wherein the trough-like liquid distribution space (14) comprises an intermediate bottom (27) that divides it into a lower and upper part (17, 18) that the recirculation line (11) is attached, in the lateral direction, to the lower part (17) of the liquid distribution space, and that the intermediate bottom comprises ports, through which the solution is allowed to flow to the upper part (18) of the space at the same time as the precipitate (23) ends up in the exhaust pipe (21) that starts from the bottom of the space.

15. The evaporator according to claim 14, wherein the flow routes formed by the openings in the intermediate bottom (27) are slanted upstream with regard to the incoming direction of the recirculation flow.

16. The evaporator according to claim 13, wherein the trough-like liquid distribution space (14) is provided with a dam plate (15), over which the solution flows as an overflow to the supply units (6) of the parallel heat exchanger elements.

17. The evaporator according to claim 6 or 7, wherein the exhaust pipe (21) leads to a settling apparatus (24), which separates the precipitate from the liquid phase that comes with it, and that the settling apparatus is connected, by using a line (26), to the recirculation line (11), in order to join that separated liquid phase to the recirculation flow in the evaporator.

* * * * *